United States Patent

Koizumi et al.

[11] Patent Number: 6,109,527
[45] Date of Patent: Aug. 29, 2000

[54] HANDY IMAGE SCANNER

[76] Inventors: Haruyuki Koizumi; Hajime Iwai; Kouji Ono; Hideki Chujyo, all of Intellectual Property Center, OMRON Corporation, 20, Igadera, Shimokaiinji, Nagaokakyo-shi, Kyoto 617, Japan

[21] Appl. No.: 08/175,182

[22] Filed: Dec. 29, 1993

Related U.S. Application Data

[63] Continuation of application No. 07/953,386, Sep. 30, 1992, abandoned, which is a continuation of application No. 07/884,309, May 11, 1992, Pat. No. 5,175,422, which is a continuation of application No. 07/537,134, Jun. 13, 1990, abandoned.

[30] Foreign Application Priority Data

Jul. 7, 1989 [JP] Japan .................................. 1-176101

[51] Int. Cl.$^7$ .................................................... G06K 7/10
[52] U.S. Cl. ................................. 235/472.01; 235/472.03
[58] Field of Search ............................. 340/710; 235/435, 235/454, 472.01, 472.03

[56] References Cited

U.S. PATENT DOCUMENTS

| | | |
|---|---|---|
| 4,521,772 | 6/1985 | Lyon ........................................ 235/472 |
| 4,575,625 | 3/1986 | Knowles .................................. 235/472 |
| 4,694,182 | 9/1987 | Howard ................................... 235/472 |
| 4,703,186 | 10/1987 | Nakayama .............................. 235/472 |
| 4,766,300 | 8/1988 | Chadima .................................. 235/472 |
| 4,806,742 | 2/1989 | Swartz ..................................... 235/472 |
| 4,916,297 | 4/1990 | Fukada .................................... 235/472 |
| 4,924,199 | 5/1990 | Hashimoto .............................. 235/472 |
| 5,047,617 | 9/1991 | Shephard ................................. 235/472 |

*Primary Examiner*—Harold I. Pitts
*Attorney, Agent, or Firm*—Dickstein Shapiro Morin & Oshinsky LLP

[57] ABSTRACT

A handy image scanner according to this invention comprises a light source, a transparent cover through which a light emitted from the light source passes to illuminate a script, and an optical system into which light reflected from the script is input, wherein the transparent cover is integrally comprised of a light gathering lens and a transparent area. Additionally, the transparent cover is bent in such a manner as to minimize the angles of incidence of light passing through the light gathering lens and the transparent area.

9 Claims, 2 Drawing Sheets

HANDY IMAGE SCANNER

This application is a continuation of application Ser. No. 07/953,386 filed Sep. 30, 1992, now abandoned. This application is a continuation of application Ser. No. 07/884,309, filed May 11, 1992, now Pat. No. 5,175,422 which is a continuation of Ser. No. 07/537,134, filed Jun. 13, 1990, now abandoned.

BACKGROUND

1. Field of the Invention

This invention relates to a handy image scanner used for inputting script images to a personal computer or a word processor.

2. Related Art

In order to efficiently illuminate script images, a light gathering lens must be placed between a light source and a script. A handy image scanner for imaging scripts must additionally have a transparent cover on the bottom to prevent dust from entering the apparatus. Consequently, the ability to provide an image scanner of small size is limited by the necessity of providing a separate light gathering lens and transparent cover. Also, installation is difficult because the optical axis of the light gathering lens and the transparent cover must be adjusted to allow a light from the light source to be properly illuminated onto the script. Accordingly, the complicated assembly leads to a high production cost.

FIG. 2 shows a cross-sectional view of the structure of an image scanner according to the above-described known scanner. The image scanner is provided in a casing 1. A reading window 2 and a transparent cover 3 are provided along the front part of the bottom portion of the casing 1 and constitute the portion of the apparatus through which a script G will be imaged. The script G is illuminated by light generated from a fluorescent light source 4 and directed through a light gathering lens (not shown) to the transparent cover 3. Since this light passes through the transparent cover 3 at an oblique angle, some incident rays are upwardly reflected (shown by arrows). The light passing through the transparent cover 3 and the reading window 2 illuminates the script G and then is reflected back into the apparatus, through another part of the transparent cover 3, in the direction of a reflecting mirror 5. However, some of this reflected light is also lost due to downwardly scattering incident reflected rays as the light again passes through the transparent cover 3 at an oblique angle. The light that does reach the reflecting mirror 5 is reflected to another reflecting mirror 6 and directed to a converging lens 7. From the converging lens 7, the light, containing script G image information, is focused onto a charge coupled device (CCD) 8, thereby generating an image data signal.

Another problem with the known scanner lies in the fact that a percentage of the light emitted from the light source 4 is lost due to both the upward and downward incident rays reflected from the top and bottom of the transparent cover 3 respectively. To compensate for decreased script G image illuminance due to this lost light, the light source 4 must increase illumination and therefore use more electrical power. Another problem stems from the upwardly reflected incident rays. These rays are directed in the general direction of the reflecting mirror 5 and if reflected thereby would ultimately reach the CCD 8 and detract from the quality of the image produced by the image scanner. Therefore, the image scanner in FIG. 2 must also include an interruption plate (not shown) located between the transparent cover 3 and the reflecting mirror 5, wherein the interruption plate blocks incident rays while allowing the reflection from the script G to pass.

SUMMARY

The object of this invention is to provide a handy image scanner that is smaller in size, less expensive to produce, and operative on less of an electrical consumption than the known scanner.

This object is realized by combining the light gathering lens and the transparent cover into one piece shaped in such a manner as to minimize the angles of incidence of the light passing through the piece. This one improvement has many beneficial effects. Scattered light is minimized. The light source can operate on less electrical power. The need for an interruption plate is eliminated. Since less parts are needed, the size of the apparatus can be reduced. The time consuming process of aligning the optical axis of the light gathering lens and the transparent cover is eliminated as they are incorporated into the same piece. And finally, the combination of the above beneficial effects enables reduction of production cost.

Thus, a handy image scanner according to this invention comprises a light source, a transparent cover through which a light emitted from the light source passes and illuminates images on a script, and an optical system into which light reflected from the script is input, wherein the transparent cover is integrally comprised of a light gathering lens and a transparent area.

Other objects and advantages of this invention will become apparent from the following description and accompanying drawings

DESCRIPTION OF THE PREFERRED EMBODIMENT

Figure 1:
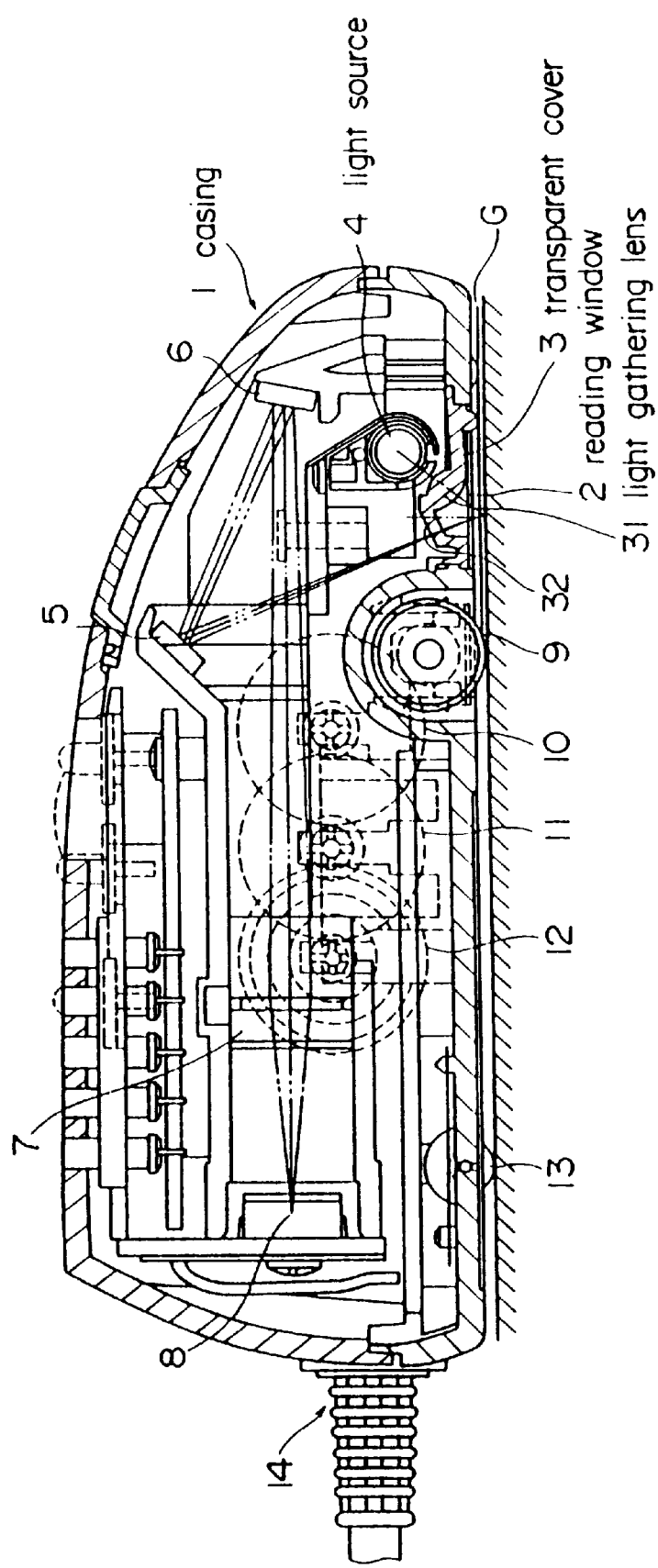
FIG. 1 is a cross-sectional view illustrating the internal structure of a handy image scanner according to this invention.

FIG. 1 is a cross-sectional view of a handy image scanner according to this invention. At the front portion of the bottom of the handy image scanner casing 1 is a reading window 2 through which an image of a script G is imaged. Situated directly above the reading window 2 is a transparent cover 3 which is made of a synthetic resin, such as acrly, polycarbonate, and the like.

To image the script G, a light generated from a light source 4 passes through a light gathering lens 31, which is integrally formed with the transparent cover 3, and is illuminated onto the script G. Light reflected from the script G then passes through a transparent area 32 of the transparent cover 3 and travels toward a reflecting mirror S. The light is then reflected to another reflecting mirror 6 where it is aimed, towards a converging lens 7 that focuses the beam on a CCD 8.

The inventive step of this invention lies in the construction of the transparent cover 3. The light gathering lens 31 and the transparent area 32 are bent in a manner to arrange that the incident angles of light passing through the transparent cover 3 is minimal, almost zero degrees. This embodiment is a vast improvement over known scanners, where the incident angles are large, enabling some of the light to be scattered and lost. The transparent cover 3 of this invention is arranged so that light will pass through the light gathering lens 31 and the transparent area 32 at right angles, thus minimizing scattered light loss.

Turning now to an explanation of an image scanning operation, an operator rolls the handy image scanner across the script G via a roller 9. The rotation of the roller 9 is transmit through gears 10 and 11 to an encoder 12 to generate a synchronous signal of scanning. In this manner, the handy image scanner can determine the relationship between images scanned and distance travelled, thus enabling the production of an image that is the same proportion of the image on the script G. Additionally provided is a supplemental roller 13 which supports the weight of the handy image scanner and enables the apparatus to roll more easily across the script G. Finally, input image data is transmit from the CCD 8 to a personal computer or word processor via cable 14.

Figure 2:
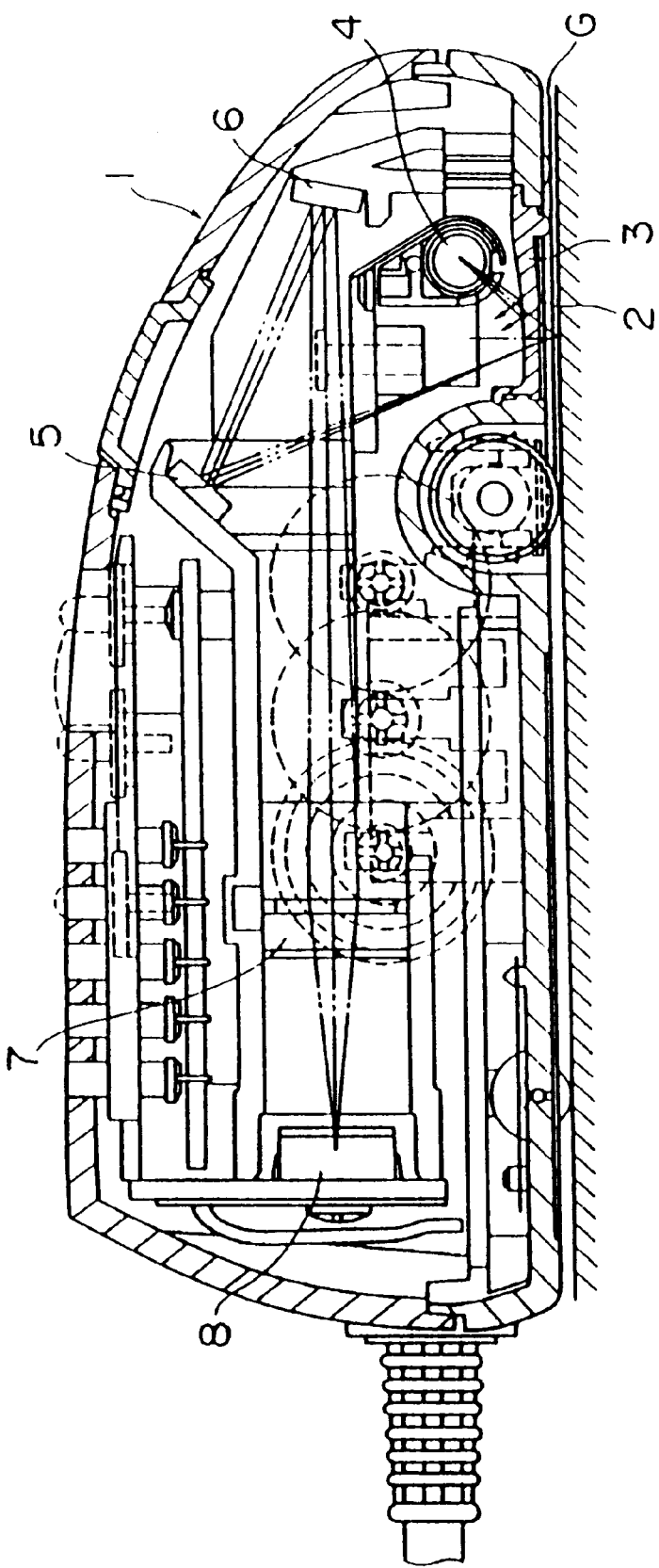
FIG. 2 is a cross-sectional view illustrating the internal structure of a known image scanner.

As shown in FIG. 2, the scanner also includes a mounting board 40 positioned above the optical path between mirror 6 and detector 8. The mounting board 40 mounts and supports one or more electrical devices 42 which protrude through a top of the casing 1.

As can be seen from the above description, the handy image scanner according to this invention has advantages over the known scanner in being easier to assemble, using less electrical power, and being smaller due to the fewer parts needed for assembly.

The above description and accompanying drawings are merely illustrative of the applications of the principles of the present invention and are not limiting. Many other embodiments falling under the spirit and scope of this invention may be devised by those skilled in the art. Accordingly, this invention is only limited by the scope of the appended claims.

What is claimed is:

1. A hand held image scanner, comprising:

a light source;

a window through which a light emitted from said light sources passes to illuminate a script;

an optical system for receiving light reflected from said script through said window, said optical system comprising a first reflection surface for receiving and reflecting light reflected from said script, a second reflection surface for receiving and reflecting light received from said first light reflecting surface and a light detector for receiving and detecting light reflected from said second reflection surface;

a casing for housing said light source and optical system, said window being provided in said casing; and a mounting board located within said casing and above an optical path between said second reflecting surface and said light detector, said mounting board being connected with at least one device which passes through said casing.

2. An image scanner in claim 1 wherein said light source is provided close to said window and said light source and first and second reflection surfaces are provided at a front portion of said scanner, said detector being provided at a rear portion of said scanner.

3. An image scanner as in claim 1, wherein said light source and second reflection surface are provided on one side of an imaginary plane which is normal to said window and extends width-wise of said scanner and said first reflection surface and detector are provided on an opposite side of said imaginary plane.

4. An image scanner as in claim 1, wherein said window is formed by a transparent cover.

5. An image scanner as in claim 4, wherein said transparent cover has a substantially flat shape.

6. An image scanner as in claim 4, wherein said transparent cover includes an integral light gathering lens.

7. A hand held image scanner according to claim 1, wherein said first reflection surface is above said optical path between said second reflection surface and said light detector.

8. A hand held image scanner according to claim 1, wherein said window is in a lower surface of said casing.

9. A hand held image scanner according to claim 8, wherein said light source is located below said optical path between said second reflection surface and said light detector.

* * * * *